(12) United States Patent
Spampinato et al.

(10) Patent No.: US 12,394,977 B2
(45) Date of Patent: Aug. 19, 2025

(54) FAULT DETECTION METHODS AND DEVICES FOR PULSE WIDTH MODULATION CONVERTERS

(71) Applicant: STMicroelectronics International N.V., Geneva (CH)

(72) Inventors: Andrea Spampinato, Mascalucia (IT); Gianluigi Forte, Camporotondo Etneo (IT)

(73) Assignee: STMicroelectronics International N.V., Geneva (CH)

(*) Notice: Subject to any disclaimer, the term of this patent is extended or adjusted under 35 U.S.C. 154(b) by 68 days.

(21) Appl. No.: 18/446,956

(22) Filed: Aug. 9, 2023

(65) Prior Publication Data

US 2025/0055272 A1    Feb. 13, 2025

(51) Int. Cl.
*H02H 7/122* (2006.01)
*H02H 7/08* (2006.01)
(Continued)

(52) U.S. Cl.
CPC .......... *H02H 7/122* (2013.01); *H02H 7/0844* (2013.01); *H02H 1/0007* (2013.01);
(Continued)

(58) Field of Classification Search
CPC .. H02H 1/0007; H02H 7/0833; H02H 7/0838; H02H 7/0844; H02H 7/122; H02H 7/1225; H02H 7/1227; H02M 1/32; H02M 1/325; H02M 7/537; H02M 7/5387; H02M 7/53871; H02M 7/53875; H02M 7/5395; H02P 27/06; H02P 27/08
See application file for complete search history.

(56) References Cited

U.S. PATENT DOCUMENTS

| | | | |
|---|---|---|---|
| 6,335,608 B1 * | 1/2002 | Takahashi | H02H 9/001 318/434 |
| 2008/0180108 A1 | 7/2008 | Pracht et al. | |

(Continued)

OTHER PUBLICATIONS

'Schmitt trigger', Wikipedia, The Free Encyclopedia, Dec. 25, 2022. Obtained from https://en.wikipedia.org/w/index.php?title=Schmitt_trigger&oldid=1129455657 on Mar. 27, 2025 (Year: 2022).*

(Continued)

*Primary Examiner* — Fred E Finch, III
(74) *Attorney, Agent, or Firm* — Alston & Bird LLP

(57) ABSTRACT

Methods, systems, and devices for fault detection at pulse width modulation converters are described. An example of one such method includes receiving a first signal including a first pulse width modulation waveform. The first signal may be for controlling a switching component via a first node. A second signal may be received. The second signal may include a second pulse width modulation waveform. The second signal may be output by a second node of the switching component. One or more operations may be performed to compare the second signal with one or more other signals or one or more thresholds. A third signal may be transmitted based at least in part on the comparison of the second signal with the one or more other signals or thresholds. The third signal may indicate whether a fault has occurred at the switching component.

20 Claims, 10 Drawing Sheets

(51) Int. Cl.
*H02M 7/5395* (2006.01)
*H02H 1/00* (2006.01)
*H02M 1/32* (2007.01)
*H02P 27/06* (2006.01)

(52) U.S. Cl.
CPC ............ *H02M 1/32* (2013.01); *H02M 7/5395* (2013.01); *H02P 27/06* (2013.01)

(56) References Cited

U.S. PATENT DOCUMENTS

| | | | |
|---|---|---|---|
| 2011/0156626 A1* | 6/2011 | Mukai ................. | B62D 5/0487 |
| | | | 318/400.21 |
| 2013/0293988 A1 | 11/2013 | Li et al. | |
| 2016/0261220 A1* | 9/2016 | Kuroiwa ............... | G01R 31/42 |
| 2018/0149712 A1* | 5/2018 | Ko ...................... | H03K 17/082 |
| 2019/0393825 A1* | 12/2019 | Maeshima ........... | H02P 29/024 |
| 2020/0028463 A1* | 1/2020 | Suzuki .................. | H02P 27/06 |
| 2020/0321902 A1* | 10/2020 | Kozawa ............... | B62D 5/0481 |
| 2020/0355745 A1* | 11/2020 | Bogus ................... | H02P 27/00 |
| 2021/0021121 A1 | 1/2021 | Lee et al. | |
| 2022/0091177 A1 | 3/2022 | Degrenne et al. | |
| 2024/0003976 A1* | 1/2024 | Tang .................... | G01R 15/04 |

OTHER PUBLICATIONS

Rahman et al., "Fault Detection of Switch Mode Power Converters Based on Radiated EMI Analysis," 2019 IEEE Energy Conversion Congress and Exposition (ECCE), Baltimore, MD, USA, pp. 2968-2972, doi: 10.1109/ECCE.2019.8913272, (2019).

* cited by examiner

600

FAULT DETECTION METHODS AND DEVICES FOR PULSE WIDTH MODULATION CONVERTERS

FIELD OF THE INVENTION

Example embodiments of the present disclosure generally relate to fault detection circuitry. More specifically, the present disclosure relates to fault detection circuitry for pulse width modulation converters.

BACKGROUND

Some electronic devices, such as motor drives, may utilize one or more converters for converting one form of electrical energy to another. Some examples of converters may include power converters, analog-to-digital converters (ADCs), digital-to-analog converters (DACs), frequency converters, voltage converters, and current converters. Some examples of power converters may include alternating current (AC) to direct current (DC) converters and DC to AC converters (e.g., inverters, pulse width modulation (PWM) converters), which may be described herein in further detail. A converter may include multiple legs, each of which may include switching circuitry. For example, a converter leg may include a first switching component (e.g., a first transistor) and a second switching component (e.g., a second transistor). In some cases, various types of faults, such as short circuits and open circuits, may occur at switching components of a converter. However, some fault detection mechanisms may not be sensitive to transient voltage spikes or may utilize relatively slow fault detection mechanisms.

BRIEF SUMMARY

Various embodiments described herein relate to methods, apparatuses, and systems associated with fault detection for pulse width modulation converters. In one aspect, a system includes a switching component including a first node, a second node, and a third node, the switching component configured to selectively couple the first node and the second node based at least in part on a first signal applied to the third node. The system may also include a voltage measurement component including a fourth node and a fifth node, the fourth node coupled with the second node, where the voltage measurement component is configured to output, via the fifth node, a second signal having a first voltage associated with the second node. The system may include a control component including a sixth node and a seventh node, the sixth node coupled with the fifth node, where the control component is configured to output, via the seventh node, a third signal based at least in part on a comparison of the second signal and the first signal, the third signal for decoupling the switching component from a load.

The system may also include a second switching component including an eighth node, a ninth node, and a tenth node, the second switching component configured to selectively couple the eighth node and the ninth node based at least in part on a fourth signal, where the ninth node is coupled with the second node. In some cases, the control component includes an analog to digital converter, the analog to digital converter configured to receive the second signal having the first voltage from the voltage measurement component. In some cases, the control component includes a fault detection component, the fault detection component configured to execute an algorithm that compares the second signal and the first signal.

In some cases, the control component includes a command component, the command component configured to output the third signal based at least in part on the comparison of the second signal and the first signal. In some cases, the control component includes a microcontroller, the microcontroller configured to output the third signal based at least in part on the comparison of the first signal and the second signal. In some cases, the control component includes one or more logic gates, and where the one or more logic gates are configured to compare the first signal with the second signal and output the third signal based at least in part on the comparison.

The system may also include a pulse width modulation voltage source coupled with the switching component, the pulse width modulation voltage source configured to output the first signal, where the first signal includes a pulse width modulation signal, and a relay configured to selectively couple the switching component with the load based at least in part on the third signal. In some cases, the load includes an electric motor. Other technical features may be readily apparent to one skilled in the art from the following figures, descriptions, and claims.

In one aspect, a method includes receiving a first signal including a first pulse width modulation waveform, the first signal for controlling a switching component via a first node, receiving a second signal including a second pulse width modulation waveform, the second signal output via a second node of the switching component, and transmitting a third signal based at least in part on a comparison of the first signal and the second signal, where the third signal indicates whether a fault has occurred at the switching component.

The method may also include determining whether the first signal and the second signal correspond to different logic states, for a duration, where transmitting the third signal is based at least in part on the determination. The method may also include determining whether an open circuit or a short circuit has occurred at the switching component based at least in part on whether the first signal and the second signal correspond to different logic states. In some cases, the third signal indicates whether the fault has occurred at any one of two or more switching components, the two or more switching components includes at least the switching component.

In some cases, the first node includes a gate node of the switching component and the second node includes a drain node of the switching component. The method may also include receiving a fourth signal including a third pulse width modulation waveform, the fourth signal for controlling a second switching component via a third node, receiving a fifth signal including a fourth pulse width modulation waveform, the fifth signal output via a fourth node, the second switching component includes the third node and the fourth node, and transmitting a sixth signal based at least in part on a comparison of the fourth signal and the fifth signal, where the sixth signal indicates whether a second fault has occurred at the second switching component. Other technical features may be readily apparent to one skilled in the art from the following figures, descriptions, and claims.

In one aspect, a non-transitory computer-readable storage medium includes instructions, the instructions executable to cause a processor to receive a first signal including a first pulse width modulation waveform, the first signal for controlling a switching component via a first node, receive a second signal including a second pulse width modulation waveform, the second signal output via a second node of the switching component, and transmit a third signal based at least in part on a comparison of the first signal and the second signal, where the third signal indicates whether a fault has occurred at the switching component.

The non-transitory computer-readable storage medium may also include instructions executable to cause the processor to determine whether the first signal and the second signal correspond to different logic states, for a duration, where transmitting the third signal is based at least in part on the determination. The non-transitory computer-readable storage medium may also include instructions executable to cause the processor to determine whether an open circuit or a short circuit has occurred at the switching component based at least in part on whether the first signal and the second signal correspond to different logic states. In some cases, the third signal indicates whether a fault has occurred at any one of two or more switching components, the two or more switching components including at least the switching component. In some cases, the first node includes a gate node of the switching component and the second node includes a drain node of the switching component.

The non-transitory computer-readable storage medium may also include instructions executable to cause the processor to receive a fourth signal including a third pulse width modulation waveform, the fourth signal for controlling a second switching component via a third node, receive a fifth signal including a fourth pulse width modulation waveform, the fifth signal output via a fourth node, the second switching component including the third node and the fourth node, and transmit a sixth signal based at least in part on a comparison of the fourth signal and the fifth signal, where the sixth signal indicates whether a second fault has occurred at the second switching component. Other technical features may be readily apparent to one skilled in the art from the following figures, descriptions, and claims.

In one aspect, a method includes receiving a signal comprising a first pulse width modulation waveform, the signal output by a converter leg comprising two or more switching components. The method may include performing, during a first time period, a first operation to determine if a voltage of the signal satisfies a first voltage threshold. The method may include performing, during a second time period, a second operation to determine if the voltage of the signal satisfies a second voltage threshold. The second voltage threshold may be higher than the first voltage threshold. In some cases, the method may include outputting an indication that one or more faults have occurred at the converter leg if the signal satisfies the first voltage threshold or the second voltage threshold.

In some cases, the first operation may be initiated based at least in part on a value of a counter being equal to a first value, and the second operation may be initiated based at least in part on the value of the counter being equal to a second value. In some cases, the first value may correspond to a maximum value of the counter and the second value may correspond to a minimum value of the counter. In some cases, performing the first operation determines if a fault has occurred at either of the two or more switching components. In some cases, the first operation and the second operation may be performed within a single pulse width modulation cycle.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some cases," "in some examples," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Figure 1:
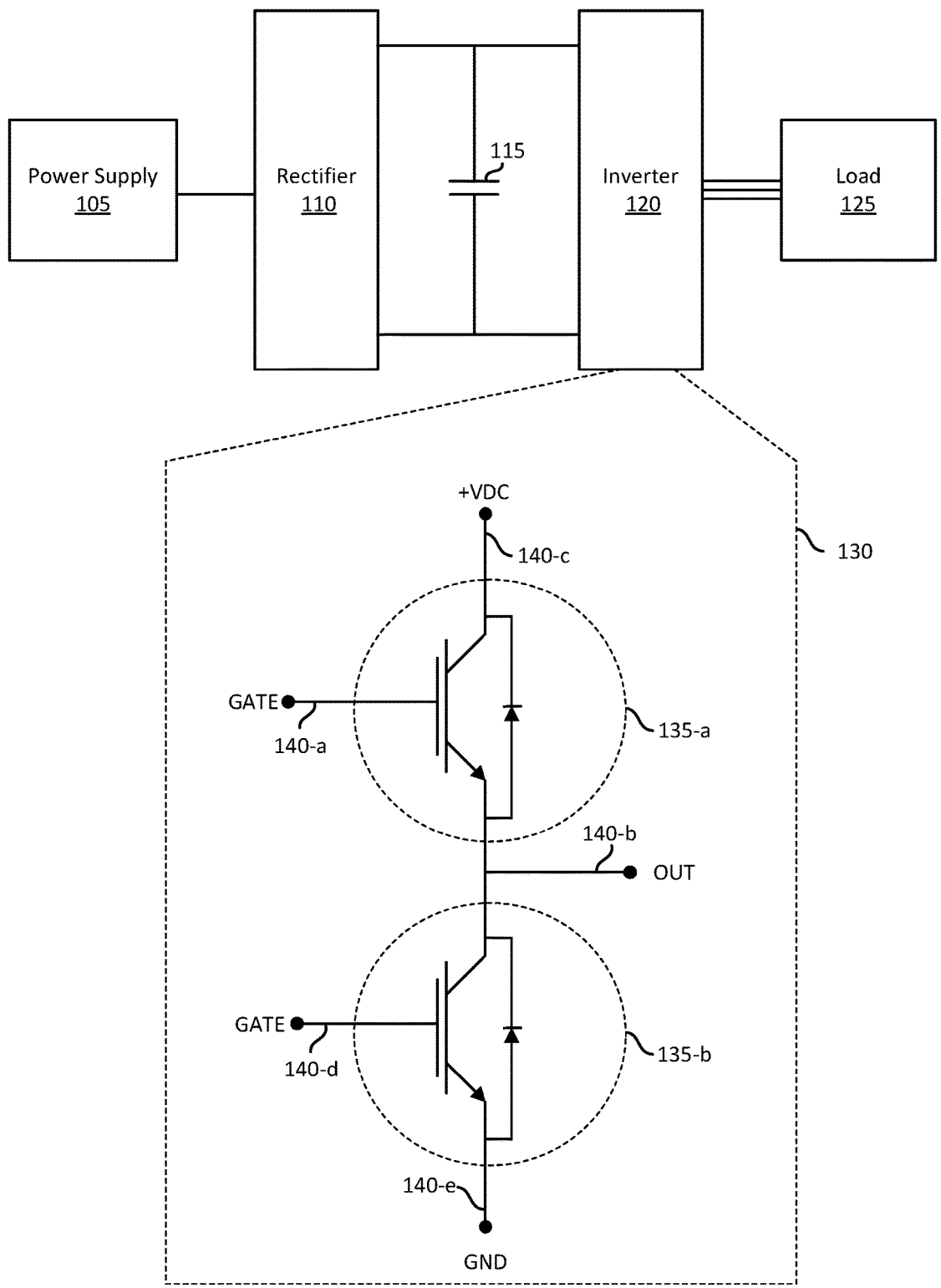
FIG. 1 illustrates an example of a system that supports fault detection methods and devices for pulse width modulation converters.

FIG. 1 illustrates an example of a system 100 that supports fault detection methods for pulse width modulation converters, in some examples. The system 100 may include a power supply 105, a rectifier 110, a storage component 115 (e.g., a capacitor), an inverter 120, and a load 125. In some cases, the inverter 120 may be an example of a converter (e.g., a pulse width modulation (PWM) converter) as described herein. The inverter 120 may include one or more legs 130 (e.g., one or more converter legs). A leg 130 may include one or more switching components 135. For example, the leg 130 may include the switching component 135-a and the switching component 135-b, which may be examples of transistors (e.g., metal oxide semiconductor field effect transistors (MOSFETs), insulated-gate bipolar transistors (IGBTs)), power switches, or any other type of switching component. Each switching component may be coupled with one or more nodes 140. For example, the switching component 135-a may be coupled with the node 140-a (e.g., a gate node), the node 140-b (e.g., an output node, a drain node), and the node 140-c (e.g., a voltage source node, a source node). Additionally, the switching component 135-b may be coupled with the node 140-d (e.g., a gate node), the node 140-e (e.g., a source node, a grounded node), and the node 140-b (e.g., a drain node).

The techniques and devices described herein may be described with reference to the following terminology. An inverter 120 may be an electronic device commonly used in alternating current (AC) motor drives and in uninterruptible AC power supplies. An inverter 120 may be capable of producing a sinusoidal AC output with configurable (e.g., controllable) magnitude and frequency. A duty cycle may be a ratio between a pulse active time (e.g., pulse width) and a total PWM period for a PWM signal. During the pulse active time a power switch (e.g., a switching component 135-a) of the inverter 120 may be switched-on. A fault-tolerant system may be a system that presents a certain level of fault tolerance which may ensure the service continuity of the system after a quantity of fault events. A short circuit may be a state caused by a damaged device and may result in a relatively low impedance (e.g., a short circuit of the switching component 135-a may couple the node 140-c with the node 140-b regardless of a signal applied to the node 140-a). An open circuit may be a state caused by a damaged device that results in relatively high impedance (e.g., an open circuit across the switching component 135-a may decouple the node 140-c and the node 140-b regardless of a signal applied to the node 140-a). An inverter leg (e.g., the leg 130) may include two switching components 135 (e.g., two power switches), which may be connected in series between DC-link terminals (e.g., +VDC and GND). The node 140-b may be an example of an output point or a middle point for the leg 130.

The inverter 120 may utilize one or more PWM signals for controlling the switching components 135. For example, the inverter 120 may include or may otherwise be coupled with signal generation circuitry (not shown) that generates one or more PWM signals. For example, a first PWM signal may be applied to the node 140-a and a second PWM signal may be applied to the node 140-b. In some cases, the second PWM signal may be the inverse of the first PWM signal, such that the switching component 135-a is open when the switching component 135-b is closed, and vice versa. Accordingly, the inverter 120 may output an AC waveform (e.g., via the node 140-b). The signal output by the inverter 120 may include multiple harmonics. For example, the signal output by the inverter 120 may include a fundamental harmonic and a high-frequency harmonic used for performing PWM. In such cases, an output filter may be represented by the load 125 (e.g., a motor). The phase voltages, $V_{a,1}$, $V_{b,1}$, and $V_{c,1}$, seen by the motor may be calculated as shown below using equations 1, 2, and 3, respectively.

$$v_{a,1} = m_a \frac{V_{dc}}{2} \sin(\omega t) \tag{1}$$

$$v_{b,1} = m_a \frac{V_{dc}}{2} \sin\left(\omega t - \frac{2}{3}\pi\right) \tag{2}$$

$$v_{c,1} = m_a \frac{V_{dc}}{2} \sin\left(\omega t + \frac{2}{3}\pi\right) \tag{3}$$

As described herein, $V_{DC}$ may be a DC voltage (e.g., applied to the node 140-c, +VDC), t may be time, ω may be an angular frequency, and $m_a$ may be an amplitude modulation coefficient (e.g., $0 \leq m_a \leq 1$), which may determine a maximum value for a duty cycle. An output power (e.g., at node 140-b) may be regulated (e.g., increased or decreased) by changing the amplitude modulation coefficient, ma. In some cases, the amplitude modulation coefficient, ma may be determined by a motor phase current controller, which may select a modulation coefficient according to one or more parameters for the load 125 (e.g., a target working point, a rotor speed, a load torque). In some cases, an amplitude and modulation coefficient for a signal output by the inverter 120 (e.g., via the node 140-b) may be constant for a same target working point.

One or more components of the system 100 may be employed for motor control applications. For example, the load 125 may be an example of a voltage-fed PWM motor. In some cases, a voltage-Fed PWM motor drive may be equipped with overcurrent protection in order to prevent power switches or motor damage. Such overcurrent protection may include one or more current sensors (e.g., shunt resistors, hall effect sensors), which may isolate a switching component 135 from a PWM signal or a voltage source (e.g., the node 140-c) if an overcurrent condition occurs. However, such overcurrent protection devices may not isolate the load 125 from the node 140-e. For example, the load 125 may remain coupled to the converter ground, which may cause loss of control or an overload condition.

In accordance with one or more aspects of the present disclosure, fault detection circuitry may be configured to more efficiently clear faults and enable the service continuity of the system 100. For example, the described circuitry may include one or more fault detection components configured to selectively isolate the leg 130 (e.g., the switching component 135-a and the switching component 135-b) from the load 125 if a fault is detected. Such fault detection components may be included in a gate driver or in an intelligent power module. Additionally, or alternatively, the techniques described herein may be utilized in systems without some current sensing components. For example, one or more voltage sensing components (e.g., a voltage sensing network, a resistive partition network) may be utilized for fault detection and thereby eliminate dependence on current sensing devices. In some cases, the one or more voltage sensing components may adapt a voltage level to an allowed range for an ADC or comparator, which may avoid the use of expensive hardware associated with current sensing.

Figure 2:
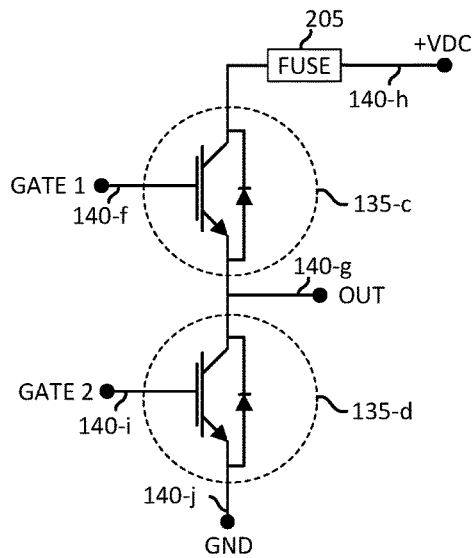
FIG. 2 illustrates an example of a system that supports fault detection methods and devices for pulse width modulation converters.
Figure 2:
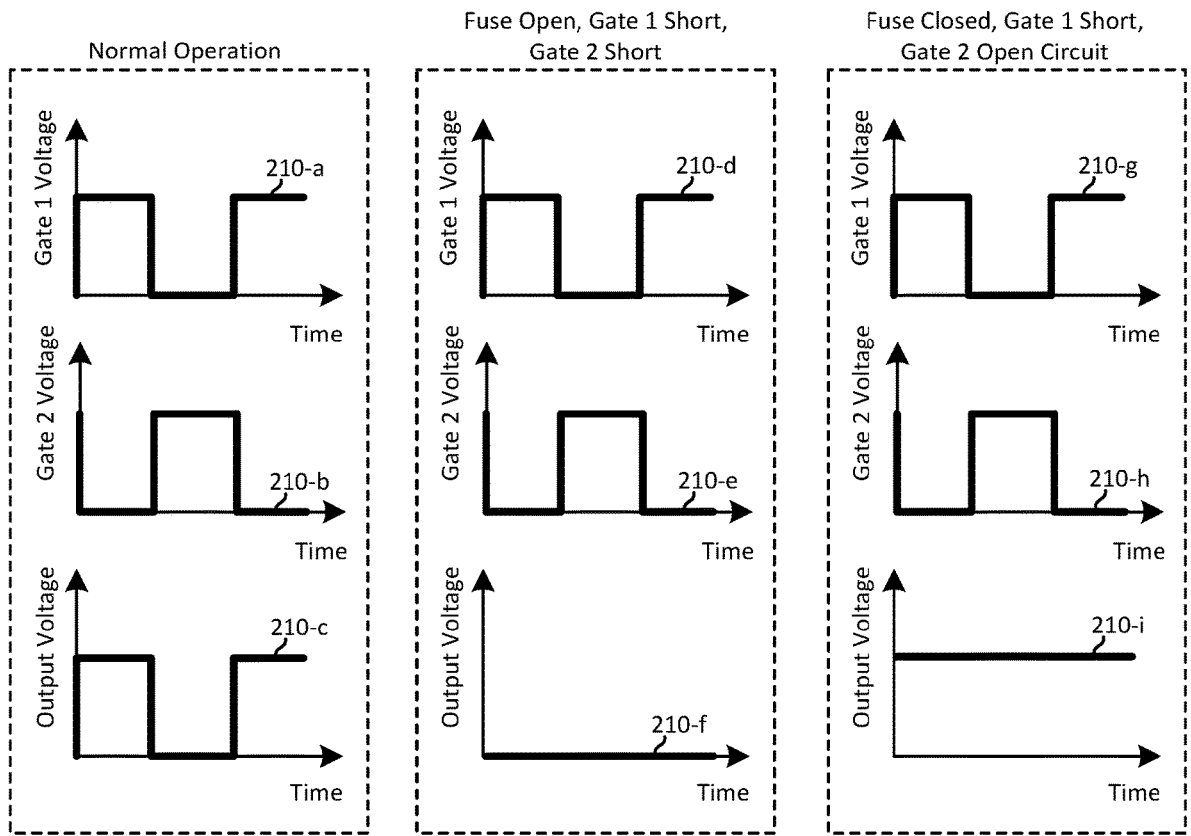

FIG. 2 illustrates an example of a system 200 that supports fault detection methods for pulse width modulation converters. The system 200 may be an example of a leg 130, as described with reference to FIG. 1, or any other converter leg. The system 200 may include a switching component 135-*c* and a switching component 135-*d*, which may be examples of switching components 135, as described with reference to FIG. 1. Each of the switching components 135 may be coupled with one or more nodes 140. For example, the switching component 135-*c* may be coupled with a node 140-*f* (e.g., a first gate node, GATE 1), a node 140-*g* (e.g., a drain node, OUT), and a node 140-*h* (e.g., a source node, +VDC). Additionally, or alternatively, the switching component 135-*c* may be coupled with a fuse 205 (e.g., located between the switching component 135-*c* and the node 140-*h*). The switching component 135-*d* may be coupled with a node 140-*i* (e.g., a second gate node, GATE 2), a node 140-*g* (e.g., a drain node, OUT), and a node 140-*j* (e.g., a source node, GND). Additionally, or alternatively, the switching component 135-*c* may be coupled with the switching component 135-*d* via the node 140-*g*. During operation, one or more faults may occur at the system 200 (e.g., at the switching component 135-*c*, at the switching component 135-*d*, or both). Additionally, or alternatively, the system may operate normally, without faults.

In a first illustrative example, the system 200 may operate normally, without faults. In such cases, the fuse 205 may be closed (e.g., current may pass through the fuse 205). A signal 210-*a* (e.g., a first PWM signal) may be applied to the node 140-*f*. The signal 210-*a* (e.g., a PWM driver signal, a gate signal) may control the operation of the switching component 135-*c*. For example, when the signal 210-*a* is high (e.g., corresponding to a first logic state), the switching component 135-*c* may be closed (e.g., current may pass from the node 140-*h* to the node 140-*g*). When the signal 210-*a* is low (e.g., corresponding to a second logic state), the switching component 135-*c* may be open (e.g., current may not pass from the node 140-*h* to the node 140-*g*). A signal 210-*b* (e.g., a second PWM signal) may be applied to the node 140-*i*. The signal 210-*b* (e.g., a PWM driver signal, a gate signal) may control the operation of the switching component 135-*d*. For example, when the signal 210-*b* is high, the switching component 135-*d* may be closed and when the signal 210-*b* is low, the switching component 135-*d* may be open. In some cases, the signal 210-*b* may be an inverse of the signal 210-*a*. In the first illustrative example, a signal 210-*c* (e.g., an output signal measured at the node 140-*g*) may follow the signal 210-*a*. That is, the signal 210-*a* and the signal 210-*c* may be the same. Stated another way, the signal 210-*a* and the signal 210-*c* may be high for a same duration and low for a same duration.

In a second illustrative example, a short may occur at the switching component 135-*c* and at the switching component 135-*d*. In such cases, the fuse 205 may be open. Accordingly, current may not pass through the fuse 205 and current may pass through the switching component 135-*c* and the switching component 135-*d*. In such cases, the node 140-*g* may be coupled with the node 140-*j* (e.g., the output may be grounded). Although not shown in FIG. 2, the node 140-*g* may be coupled with a load, such as a motor, and the occurrence of a short at the switching component 135-*c* may ground the motor (e.g., via the node 140-*j*). A signal 210-*d* may be applied to the node 140-*f* and a signal 210-*e* may be applied to the node 140-*i*. However, the signal 210-*f* (e.g., measured at the node 140-*g*) may not follow the signal 210-*d*. For example, the signal 210-*f* may correspond to a low logic state and may be static (e.g., for a duration).

In accordance with one or more aspects of the present disclosure, a fault detection operation may be performed to determine that a fault condition has occurred (e.g., to determine that short circuits have occurred at the switching component 135-*c* and the switching component 135-*d*). The fault detection operation may include comparing the signal 210-*f* to the signal 210-*d*. More specifically, an amplitude of the signal 210-*f* may be compared with an amplitude of the signal 210-*d*. Although one illustrative example relates to amplitude comparison, other signal parameters may be compared to determine if the signal 210-*f* follows the signal 210-*d*. For example, a logic state of the signal 210-*f* may be compared to a logic state of the signal 210-*d* (e.g., during a same duration). Additionally, or alternatively, respective frequencies or one or more other waveform characteristics of the signal 210-*f* and the signal 210-*d* may be compared. In some cases, the signal 210-*f* and the signal 210-*d* may be compared during a time window (e.g., for a duration), which may be selected based on one or more parameters of the signals 210 (e.g., based on frequencies or periodicities of the signals 210). Additionally, or alternatively, the fault detection operation may be performed periodically or continuously. As described herein, a fault signal (e.g., an error signal) may be triggered (e.g., transmitted) if the signal 210-*f* does not follow the signal 210-*d* (e.g., if the signal 210-*f* is not the same as the signal 210-*d*). The fault signal may be a control signal that opens a relay or any other type of switch and thereby decouples the node 140-*g* from a load.

In a second illustrative example, a short may occur at the switching component 135-*c* and an open circuit may occur at the switching component 135-*d*. In such cases, the fuse 205 may be closed. Accordingly, current may pass through the fuse 205, current may pass through the switching component 135-*c*, and current may not pass through the switching component 135-*d*. In such cases, the node 140-*g* may be coupled with the node 140-*h* (e.g., statically). Although not shown in FIG. 2, the node 140-*g* may be coupled with a load, such as a motor, and the occurrence of a short at the switching component 135-*c* may result in an overcurrent condition at the motor. A signal 210-*g* may be applied to the node 140-*f* and a signal 210-*h* may be applied to the node 140-*i*. However, the signal 210-*i* (e.g., measured at the node 140-*g*) may not follow the signal 210-*g*. For example, the signal 210-*i* may correspond to a high logic state (e.g., corresponding to +VDC) and may be static (e.g., for a duration).

In accordance with one or more aspects of the present disclosure, a fault detection operation may be performed to determine that a fault condition has occurred (e.g., to determine that a short circuit has occurred at the switching component 135-*c* and an open circuit has occurred at the switching component 135-*d*). The fault detection operation may include comparing the signal 210-*i* to the signal 210-*g*. More specifically, an amplitude of the signal 210-*i* may be compared with an amplitude of the signal 210-*g*. Although one illustrative example relates to amplitude comparison, other signal parameters may be compared to determine if the signal 210-*i* follows the signal 210-*g*. For example, a logic state of the signal 210-*i* may be compared to a logic state of the signal 210-*g* (e.g., during a same duration). Additionally, or alternatively, respective frequencies or one or more other waveform characteristics of the signal 210-*i* and the signal 210-*g* may be compared. In some cases, the signal 210-*i* and the signal 210-*g* may be compared during a time window (e.g., for a duration), which may be selected based on one or more parameters of the signals 210 (e.g., based on frequencies or periodicities of the signals 210). Additionally, or alternatively, the fault detection operation may be performed periodically or continuously. As described herein, a fault signal (e.g., an error signal) may be triggered (e.g., transmitted) if the signal 210-$i$ does not follow the signal 210-$g$ (e.g., if the signal 210-$i$ is not the same as the signal 210-$g$). The fault signal may be a control signal that opens a relay or any other type of switch and thereby decouples the node 140-$g$ from a load.

Although illustrative examples described herein refer to a limited quantity of specific fault conditions, the techniques described herein may be applied to detect any type of fault condition. For example, the techniques described herein may be capable of detecting any combination of short circuits and open circuits occurring at any combination of switching components 135. While illustrative examples described herein generally refer to comparing a signal 210 measured at the node 140-$f$ with a signal 210 measured at the node 140-$g$, signal comparison operations may be performed using any combination of nodes 140. For example, a signal 210 measured at the node 140-$i$ may be compared with a signal 210 measured at the node 140-$g$. While examples described herein generally refer to signals 210, it should be understood that the terms "signal," "waveform," "PWM signal," and "pulse" may be used interchangeably. It should additionally be understood that signals 210 may be representative of voltages, which may be measured between respective nodes 140 and a grounded reference node (e.g., the node 140-$j$).

Figure 3:
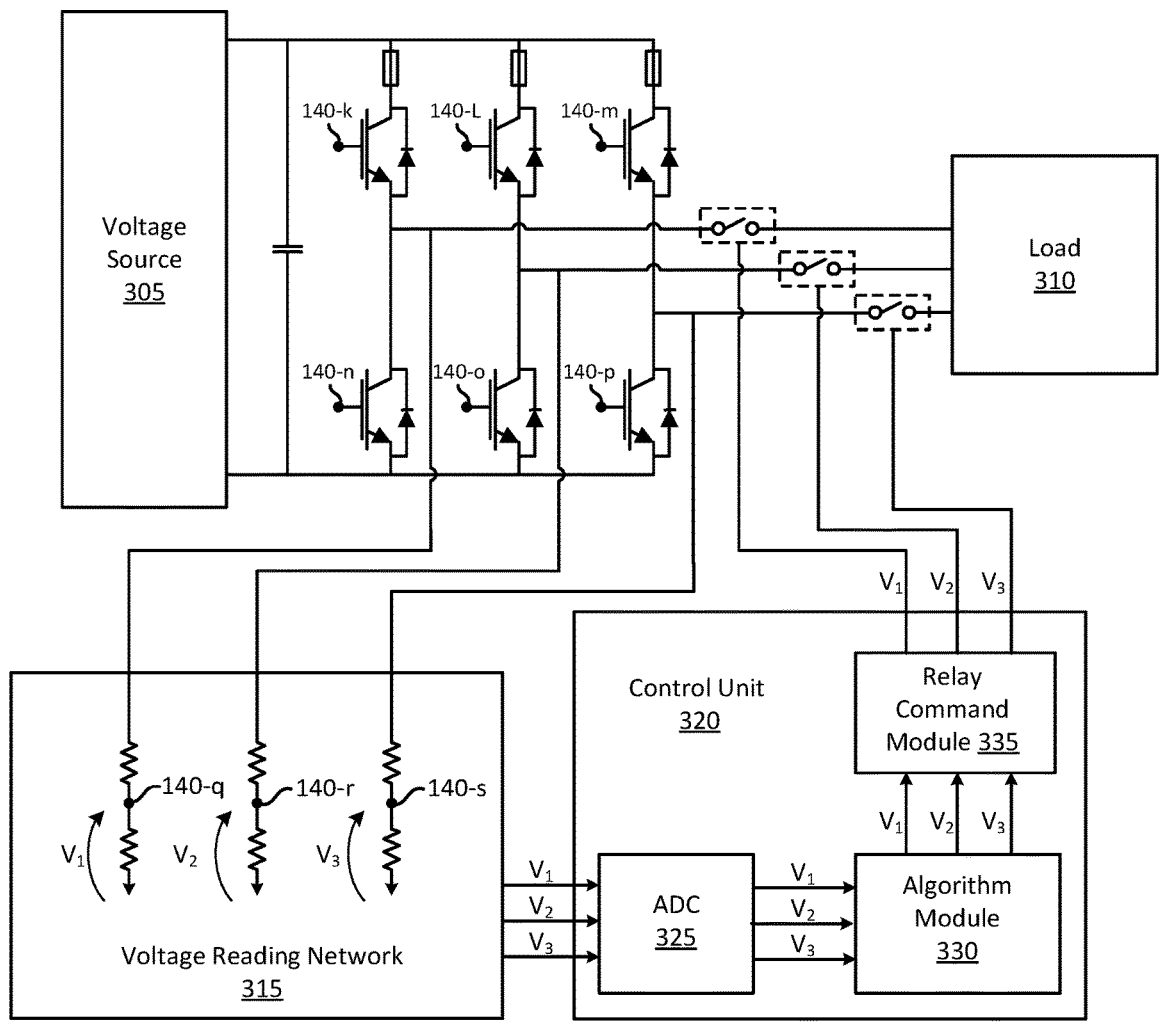
FIG. 3 illustrates an example of a system that supports fault detection methods and devices for pulse width modulation converters.

FIG. 3 illustrates an example of a system 300 that supports fault detection methods for pulse width modulation converters. The system 300 may provide one illustrative example of circuitry configured to perform the operations described herein. For example, the system 300 may include a control unit 320 (e.g., a microcontroller) configured to perform the operations described herein. The system 300 may also include a voltage source 305, a voltage reading network 315, a load 310, an analog to digital converter (ADC) 325, an algorithm module 330, a relay command module 335, a plurality of switching components 135, a plurality of resistors 340, a plurality of fuses 355, a plurality of relays 345, and a capacitor 350. As described herein the system 300 may be an example of fault detection circuitry and may accordingly be configured to monitor for electrical faults occurring at one or more of the switching components 135.

The system 300 may include a voltage reading network 315, which may be configured to read (e.g., measure, determine) a plurality of voltages (e.g., $V_1$, $v_2$, $v_3$, and so forth) corresponding to signals output by a converter. For example, a converter may include a plurality of legs, where each leg includes a set of switching components 135. Switching components 135 of a set may be coupled in series and may be configured to output respective PWM signals. Each converter leg may output a PWM signal, which may be routed to the voltage reading network 315. The voltage reading network 315 may receive the PWM signals and determine or output a voltage (e.g., $v_1$, $v_2$, $v_3$, and so forth) for each PWM signal. In some cases, the voltage reading network 315 may be configured to step down or reduce voltages output by converter legs such that the voltages $v_1$, $v_2$, and $v_3$ may each be below a voltage threshold for the ADC 325. That is, in some cases, the voltages $v_1$, $v_2$, and $v_3$ may be proportional to voltages of PWM signals output by respective converter legs. The voltage reading network 315 may include a plurality of resistors 340, and the voltages, $v_1$, $v_2$, and $v_3$ may be read or determined across respective resistors 340, as shown. For example, the voltage $v_1$ may be measured between the node 140-$q$ and ground. Although the system 300 illustrates one example of a converter that includes three legs (e.g., corresponding to six switching components 135), the techniques described herein may be applied to a converter that includes any quantity of legs.

The voltage reading network 315 may be coupled with the control unit 320. For example, the voltage reading network 315 may be coupled with the ADC 325 of the control unit 320. The voltage reading network 315 may output signals (e.g., having voltages $v_1$, $v_2$, and $v_3$) and the signals may be received by the ADC 325. The ADC 325 may perform one or more operations to convert the signals into digital signals. For example, each digital signal output by the ADC 325 may include one or more bits, which may indicate a logical state.

The control unit 320 may include an algorithm module 330, which may receive the digital signals from the ADC 325. The algorithm module 330 may be configured to execute one or more algorithms (e.g., firmware) to compare the digital signals corresponding to $v_1$, $v_2$, and $v_3$, with respective PWM signals that control (e.g., drive) respective switching components 135. For example, the algorithm module 330 may compare the digital signal corresponding to $v_1$ with a PWM signal applied to the node 140-$k$. Additionally, the algorithm module 330 may compare the digital signal corresponding to $v_2$ with a PWM signal applied to the node 140-L, and may compare the digital signal corresponding to $v_3$ with a PWM signal applied to the node 140-$m$. If a respective digital signal input to the algorithm module 330 does not follow (e.g., is different from) a respective PWM signal applied to a node 140 (e.g., corresponding to a same inverter leg), the algorithm module 330 may transmit an alarm signal to the relay command module 335. The relay command module 335 may then receive the alarm signal and transmit a disconnect signal to a relay 345, which may decouple a respective inverter leg from the load 310. Although not shown in FIG. 3, the control unit 320 may be configured to receive a plurality of PWM signals applied to nodes 140. For example, the algorithm module may be coupled with one or more of the nodes 140 and may receive PWM signals applied to each node 140.

The fault detection techniques described herein may provide one or more advantages when compared to other fault detection techniques including increased fault detection speed, the ability to detect both short-circuit faults and open-circuit faults, cost reduction, reduced dependence on some types of current sensing devices, and improved service continuity. In some examples, the techniques described herein may be implemented by a microcontroller algorithm (e.g., by the control unit 320). In some other examples described in further detail with reference to FIG. 4, the techniques described herein may be implemented by a gate driver or by an intelligent power module (e.g., using hardware components).

Figure 4:
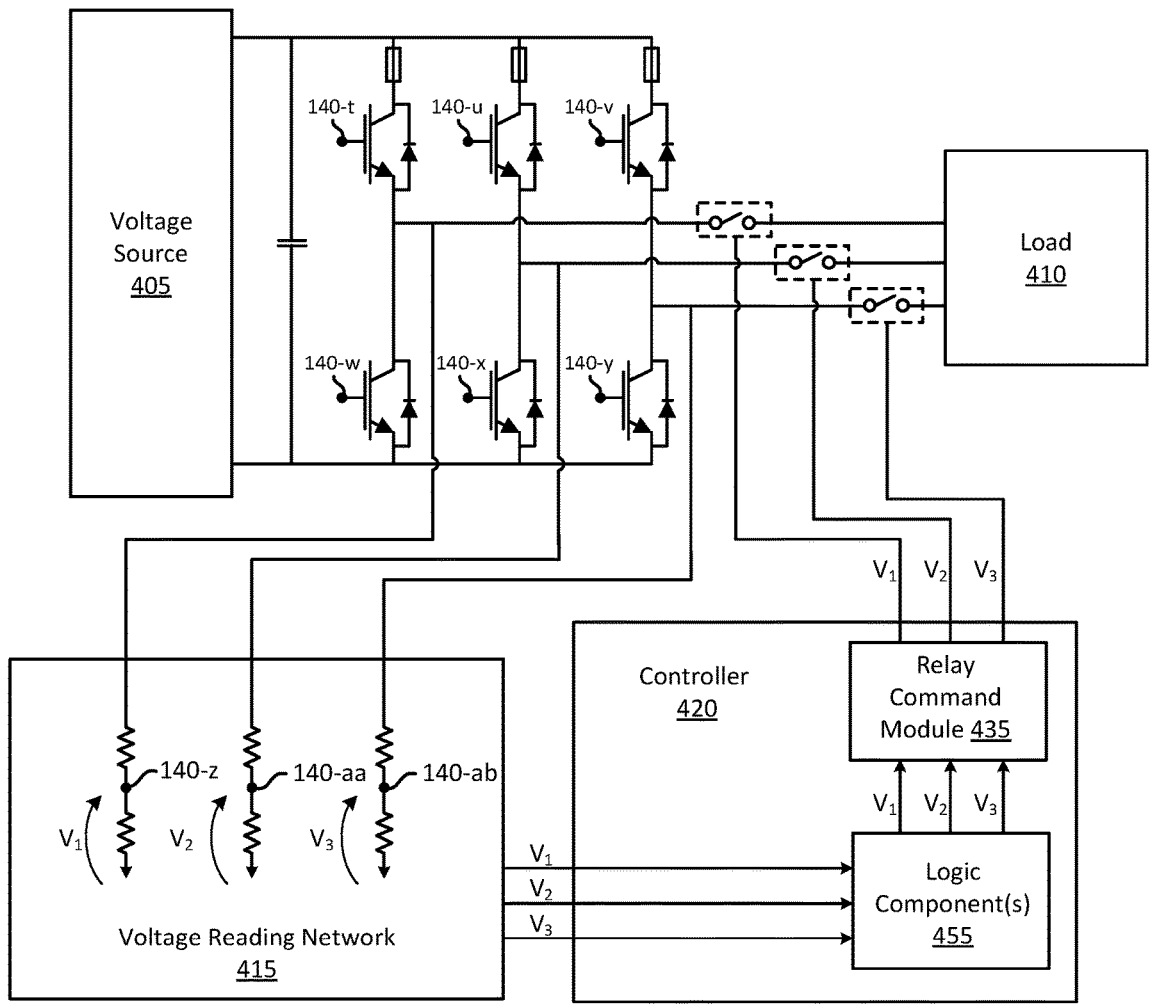
FIG. 4 illustrates an example of a system that supports fault detection methods and devices for pulse width modulation converters.

FIG. 4 illustrates an example of a system 400 that supports fault detection methods for pulse width modulation converters. The system 400 may provide one illustrative example of circuitry configured to perform the operations described herein. For example, the system 400 may include a controller 420 configured to perform the operations described herein. The controller 420 may include one or more logic components 455 (e.g., one or more hardware components) that may be configured to determine if one or more faults have occurred. The system 400 may also include a voltage source 405, a voltage reading network 415, a load 410, a relay command module 435, a plurality of switching components 135, a plurality of resistors 440, a plurality of fuses 460, a plurality of relays 445, and a capacitor 450. As described herein the system 400 may be an example of fault detection circuitry and may accordingly be configured to monitor for electrical faults occurring at one or more of the switching components 135.

The system 400 may include a voltage reading network 415, which may be configured to read (e.g., measure, determine) a plurality of voltages (e.g., $v_1$, $v_2$, $v_3$, and so forth) corresponding to signals output by a converter. For example, a converter may include a plurality of legs, where each leg includes a set of switching components 135. Switching components 135 of a set may be coupled in series and may be configured to output a PWM signal. Each converter leg may output a PWM signal, which may be routed to the voltage reading network 415. The voltage reading network 415 may receive the PWM signals and determine a voltage (e.g., $v_1$, $v_2$, $v_3$, and so forth) for each PWM signal. The voltage reading network 415 may include a plurality of resistors 440, and the voltages, $v_1$, $v_2$, and $v_3$ may be read across respective resistors 440, as shown. For example, the voltage $v_1$ may be measured between the node 140-z and ground. Although the system 400 illustrates one example of a converter that includes three legs (e.g., corresponding to six switching components 135), the techniques described herein may be applied to a converter that includes any quantity of legs.

The voltage reading network 415 may be coupled with the controller 420. For example, the voltage reading network 415 may be coupled with one or more logic components 455 of the control unit 320. The one or more logic components 455 may include any combination of gates (e.g., AND gates, OR gates, NOT gates, NAND gates, NOR gates, XOR gates, XNOR gates), flip flops, multiplexers, demultiplexers, encoders, decoders, and shift registers. The voltage reading network 415 may output the PWM signals (e.g., having voltages $v_1$, $v_2$, and $v_3$) and the PWM signals may be received by the one or more logic components 455. The one or more logic components 455 may be utilized to determine if respective PWM signals corresponding to $v_1$, $v_2$, and $v_3$, follow respective input PWM signals that control (e.g., drive) respective switching components 135. For example, the one or more logic components 455 may compare the PWM signal corresponding to $v_1$ with an input PWM signal applied to the node 140-t. Additionally, the one or more logic components 455 may compare the PWM signal corresponding to $v_2$ with an input PWM signal applied to the node 140-u, and may compare the PWM signal corresponding to $v_3$ with an input PWM signal applied to the node 140-v. If a respective PWM signal input to the one or more logic components 455 does not follow (e.g., is different from) a respective PWM signal applied to a node 140 (e.g., corresponding to a same inverter leg), the one or more logic components 455 may output an alarm signal to the relay command module 435. The relay command module 435 may then receive the alarm signal and transmit a disconnect signal to a relay 445, which may decouple a respective inverter leg from the load 410. Although not shown in FIG. 4, the controller 420 may be configured to receive a plurality of PWM signals applied to nodes 140. For example, the one or more logic components 455 may be coupled with one or more of the nodes 140 and may receive input PWM signals applied to each node 140.

Figure 5:
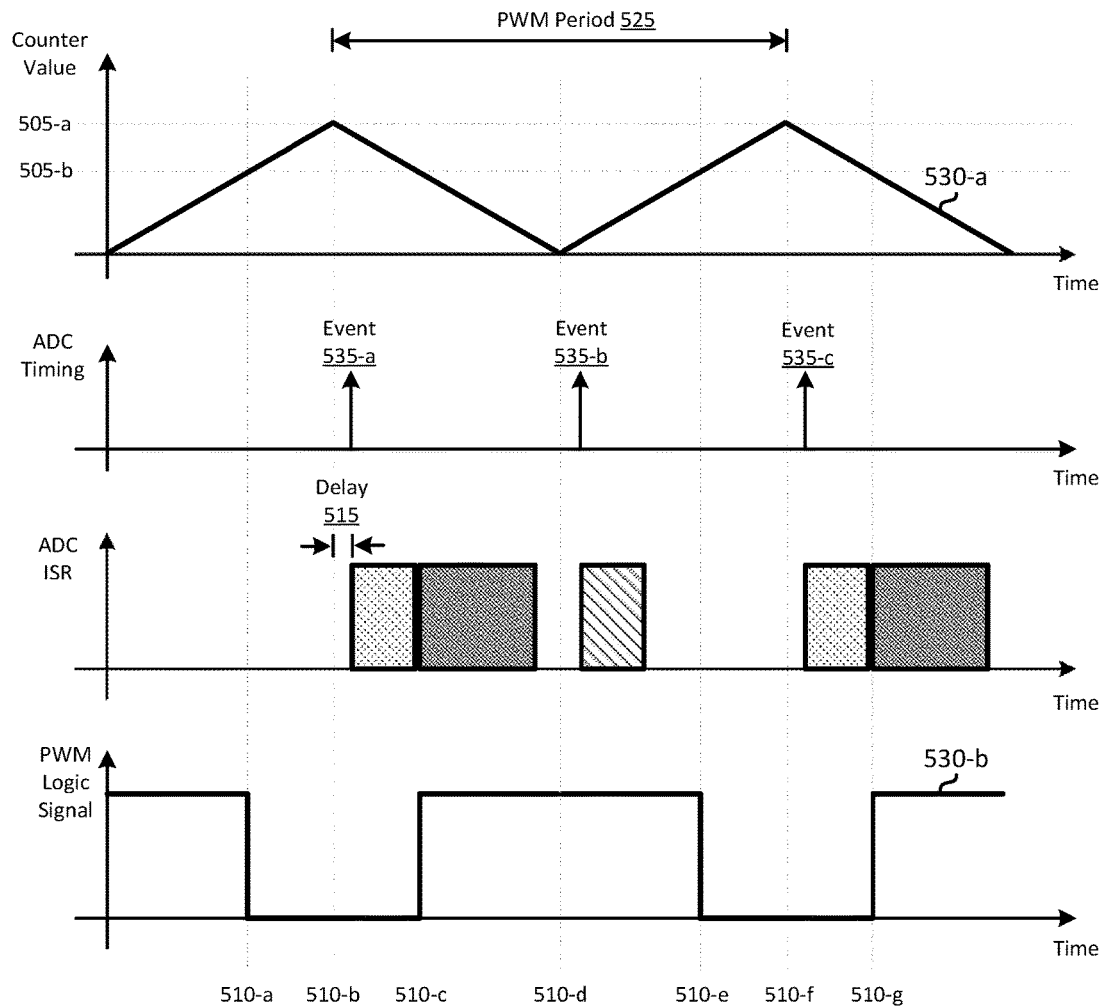
FIG. 5 illustrates an example of a timing diagram that supports fault detection methods and devices for pulse width modulation converters.
Figure 5:
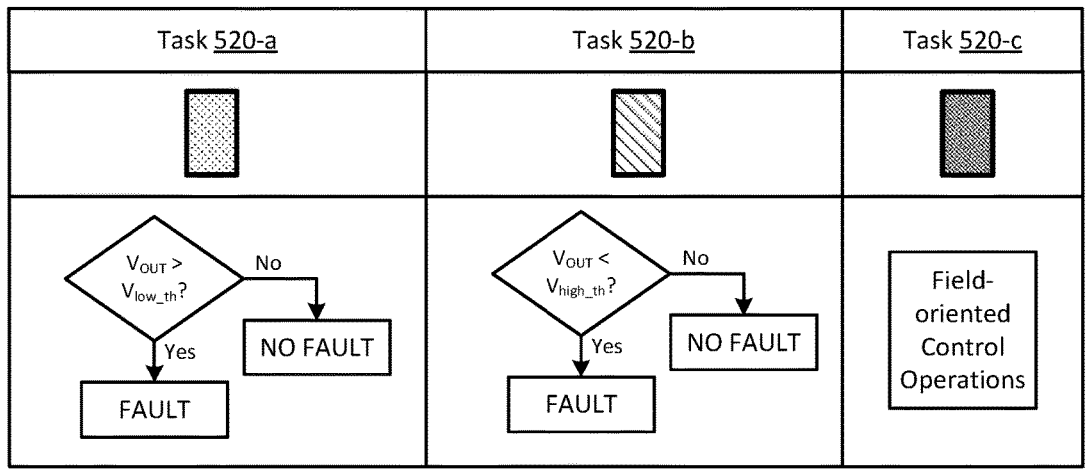

FIG. 5 illustrates example of a timing diagram 500 that supports fault detection methods for pulse width modulation converters. The timing diagram 500 may include signals 530, events 535, and tasks 520 (e.g., operations), which may each occur or be performed at respective times 510. Timing diagram 500 may include multiple axes, which may each be used to illustrate respective signals 530, events 535, and tasks 520, as described herein. For example, the timing diagram 500 may include a first axis used to illustrate counter values (e.g., a signal 530-a, a counter signal), a second axis used to illustrate ADC timing (e.g., events 535), a third axis (e.g., an ADC interrupt service routine (ISR) axis) used to illustrate one or more tasks 520 that are performed (e.g., by a controller), and a fourth axis used to illustrate a PWM logic signal (e.g., a signal 530-b) output by a converter leg (e.g., via node 140-g). As described herein, tasks 520 and associated operations may be performed to detect electrical faults at switching components 135, as described with reference to FIGS. 1-4.

The timing diagram 500 may illustrate a signal 530-b (e.g., a PWM signal) that is output by a converter leg 130 (e.g., via a node 140-b, via a node 140-g). The signal 530-b may be an example of a digital signal and may include regions corresponding to different logic states. For example, from the time 510-a to the time 510-c, a voltage of the signal 530-b may correspond to a low logic state (e.g., a logic 0). From the time 510-c to the time 510-e, a voltage of the signal 530-b may correspond to a high logic state (e.g., a logic 1). From the time 510-e to the time 510-g, a voltage of the signal 530-b may correspond to a low logic state. Although the signal 530-b shows different logic states occurring over time, it should be noted that if a fault occurs at a switching component 135, the signal 530-b may change or otherwise become constant. Examples of such faults are described in further detail with reference to FIG. 2, where the signal 210-c, the signal 210-f, and the signal 210-i may be examples of the signal 530-b when various operational conditions occur.

In some cases, the signal 530-b may be based on, be triggered by, or otherwise correspond to a counter or a counter value 505. In such cases, a first register (e.g., a capture command register (CCR)) may be used to store a counter value 505-b. The counter value 505-b may correspond to a timing (e.g., a duty cycle) of the signal 530-b such that the signal 530-b may switch from a high logic state to a low logic state when a counter is equal to the counter value 505-b. The signal 530-a may track or otherwise correspond to the value 505 of the counter over time. In some cases, a second register (e.g., an auto-reload register (ARR)) may be used to store a counter value 505-a. The counter value 505-a may be an example of a maximum value for the counter. In some cases, the counter may be initialized and may be periodically incremented (e.g., a value of the counter may be periodically increased) until the counter is equal to the counter value 505-a. Once the value of the counter reaches the counter value 505-a, the counter may be periodically decremented (e.g., a value of the counter may be periodically decreased) until a minimum value (e.g., 0) is reached. In some cases, the counter value 505-a may correspond to a PWM period 525 (e.g., a periodicity of the signal 530-b).

In some cases, the signal 530-b may indicate a low logic state for a first duration (e.g., from the time 510-a to the time 510-c). The counter value 505-a may correspond to a midpoint of the first duration (e.g., a time 510-b). Similarly, the signal 530-b may indicate a high logic state for a second duration (e.g., from the time 510-c to the time 510-e). A minimum value of the counter (e.g., 0) may correspond to a midpoint of the second duration (e.g., the time 510-d). As described herein, the task 520-a may be triggered (e.g., initiated) when the counter reaches the counter value 505-a (e.g., at the time 510-b, at the time 510-f). Similarly, the task 520-b may be triggered when the counter reaches a minimum counter value (e.g., at the time 510-d). Although a task 520 may be triggered at a time 510, one or more operations associated with the task 520 may not be performed instantaneously. For example, a delay 515 may occur (e.g., due to processing latency) between a time 510 when a respective task 520 is initiated and when the task 520 is performed (e.g., when operations associated with the task 520 are performed).

Performing the task 520-a may include performing one or more operations (e.g., by a control until 320, by a controller 420) to determine if a voltage of the signal 530-b satisfies a first voltage threshold (e.g., a low voltage threshold, $V_{low\_th}$). For example, at any time 510 between the time 510-b and the time 510-c, one or more operations may be performed to determine if a voltage of the signal 530-b is greater than the first voltage threshold. The first voltage threshold may be a voltage corresponding to a low logic state. If the voltage of the signal 530-b is greater than the first voltage threshold, a fault (e.g., at one or more switching components 135) may be detected and a fault signal may be output (e.g., by the control unit 320, by the controller 420). If the voltage of the signal 530-b is less than or equal to the first voltage threshold, a fault may not be detected and a fault signal may not be output.

Performing the task 520-b may include performing one or more operations (e.g., by a control unit 320, by a controller 420) to determine if a voltage of the signal 520-b satisfies a second voltage threshold (e.g., a high voltage threshold, $V_{high\_th}$). For example, at any time 510 between the time 510-c and the time 510-e, one or more operations may be performed to determine if a voltage of the signal 530-b is less than the second voltage threshold. The second voltage threshold may be a voltage corresponding to a high logic state. If the voltage of the signal 530-b is less than the second voltage threshold, a fault (e.g., at one or more switching components 135) may be detected and a fault signal may be output (e.g., by the control unit 320, by the controller 420). If the voltage of the signal 530-b is greater than or equal to the second voltage threshold, a fault may not be detected and a fault signal may not be output.

Figure 6:
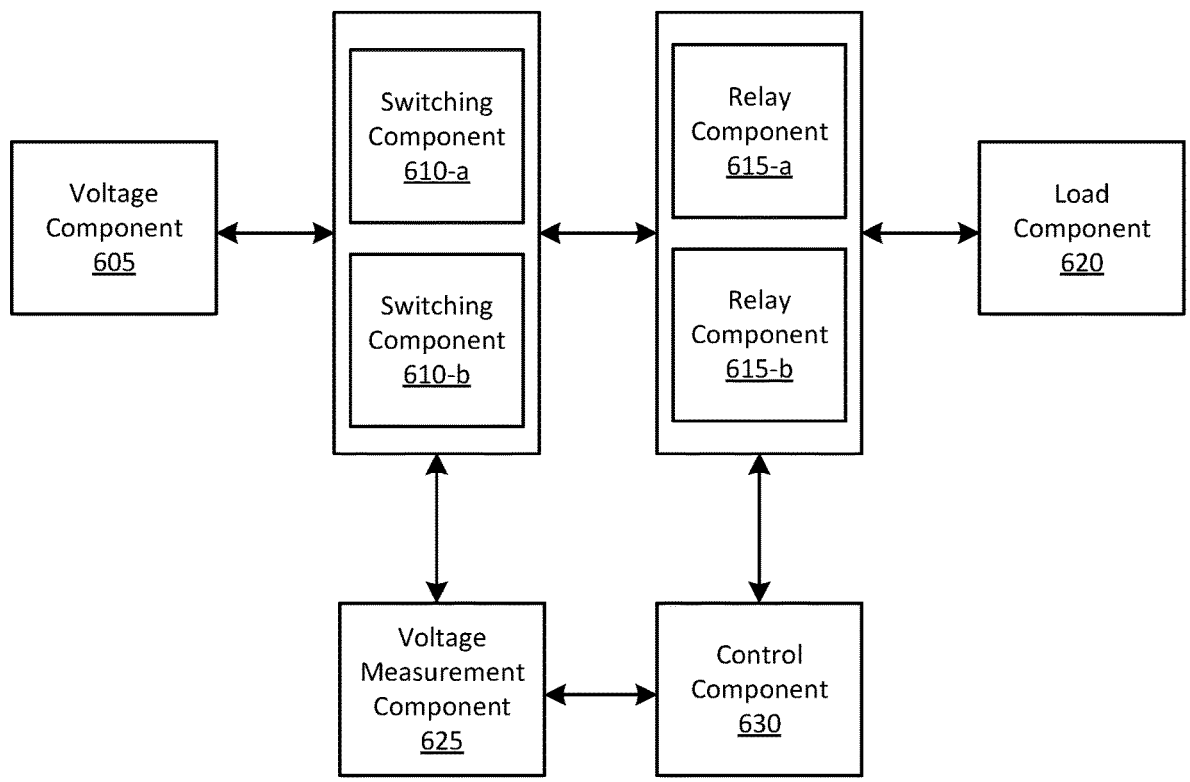
FIG. 6 illustrates an example of a block diagram that supports fault detection methods and devices for pulse width modulation converters.

FIG. 6 illustrates an example of a block diagram 600 that supports fault detection methods for pulse width modulation converters. The block diagram 600 may include a voltage component 605, one or more switching components 610, one or more relay components 615, a load component 620, a voltage measurement component 625, and a control component 630. The one or more components of the block diagram 600 may be examples of components described with reference to FIGS. 1-5 and may be configured to perform the operations described herein.

The block diagram 600 may include a switching component 610-a including a first node, a second node, and a third node. For example, the switching component 610-a may be an example of a power switch that includes three terminals. The third node may be for controlling the switching component 610-a. For example, the switching component 610-a may be configured to selectively couple the first node and the second node based on a first signal applied to the third node (e.g., a PWM signal). The block diagram 600 may include a voltage measurement component 625 including a fourth node and a fifth node. The fourth node may be coupled with the second node of the switching component 610-a. The voltage measurement component 625 may be configured to output, via the fifth node, a second signal having a first voltage associated with the second node. For example, the second signal may indicate a voltage measured at the second node.

The block diagram 600 may include a control component 630 including a sixth node and a seventh node. The sixth node may be coupled with the fifth node. In some cases, the control component 630 may be configured to output, via the seventh node, a third signal based on a comparison of the second signal and the first signal. In some other cases, the control component 630 may be configured to output, via the seventh node, the third signal based on a comparison of the second signal (e.g., a voltage of the second signal) and a threshold voltage (e.g., a low voltage threshold, a high voltage threshold, or both). In some cases, the third signal may be for decoupling the switching component 610-a from a load component 620.

The block diagram 600 may include a switching component 610-b. The switching component 610-b may include an eighth node, a ninth node, and a tenth node. The switching component 610-b may be configured to selectively couple the eighth node and the ninth node based on a fourth signal. In some cases, the ninth node may be coupled with the second node. In some cases, the control component 630 may include an analog to digital converter. The analog to digital converter may be configured to receive the second signal having the first voltage from the voltage measurement component 625.

In some cases, the control component 630 may include a fault detection component, the fault detection component may be configured to execute an algorithm that compares the second signal and the first signal. Additionally, or alternatively, the control component may compare the second signal with one or more threshold voltages. In some cases, the control component 630 may include a command component. The command component may be configured to output the third signal based on the comparison of the second signal and the first signal, or based on the comparison of the second signal and one or more threshold voltages. In some cases, the control component 630 may include a microcontroller. The microcontroller may be configured to output the third signal based on the comparison of the first signal and the second signal, or based on the comparison of the second signal and one or more threshold voltages. In some cases, the control component 630 may include one or more logic gates. In some cases, the one or more logic gates may be configured to compare the first signal with the second signal, or compare the second signal with one or more threshold voltages, and output the third signal based on the comparison.

The block diagram 600 may include a voltage component 605 (e.g., a PWM voltage source) coupled with the switching components 610. The voltage component 605 may be configured to output the first signal. In some cases, the first signal may include a PWM signal. The block diagram 600 may also include one or more relay components 615. For example, the one or more relay components 615 may be configured to selectively couple one or more switching components 610 with the load component 620 (e.g., based on the third signal). In some cases, the load component 620 may be an example of an electric motor, a pump, an actuator, a household appliance, or any other load associated with a switching power supply.

Figure 7:
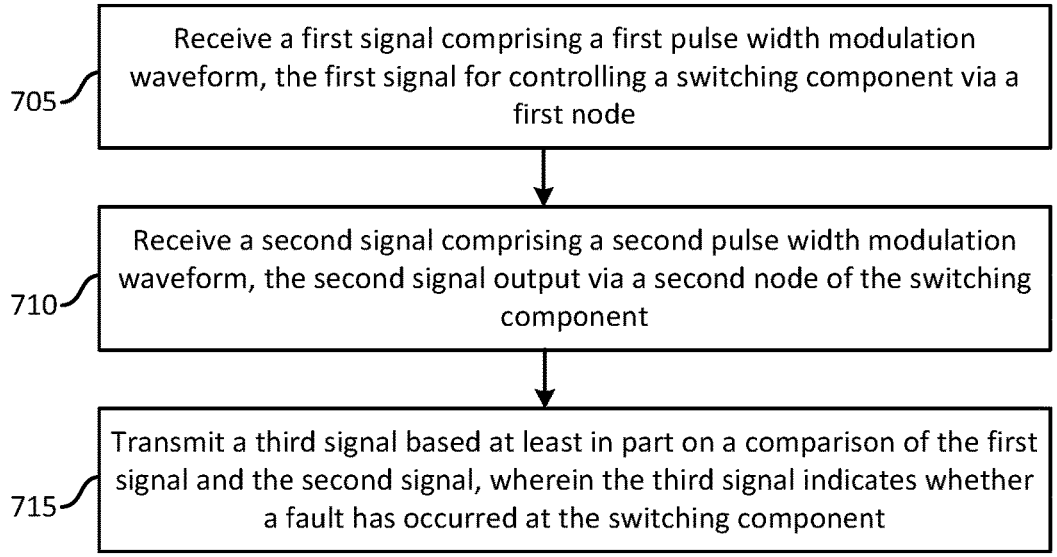
FIGS. 7-10 illustrate examples of flowcharts that support fault detection methods and devices for pulse width modulation converters.

FIG. 7 illustrates an example of a flowchart illustrating a method 700 that supports fault detection methods for pulse width modulation converters. The operations of the method 700 may be implemented by one or more devices as described herein. For example, the method 700 may be implemented by any component of a system described herein, such as a control unit, a controller, a voltage reading network, an ADC, an algorithm module, a relay command module, or one or more logic components. In some cases, a device or component as described herein may execute instructions to control one or more functional elements to perform the described operations. For example, a control unit (e.g., a microcontroller) may execute instructions to perform the method 700. Additionally, or alternatively, a device or component of a system may perform aspects of the described operations using special-purpose hardware.

At 705, the method 700 may include receiving a first signal comprising a first PWM waveform. The first signal may be for controlling a switching component via a first node. In some examples, aspects of the operations may be performed using a special-purpose hardware or a control unit such as a microcontroller.

At 710, the method 700 may include receiving a second signal comprising a second PWM waveform. The second signal may be output via a second node of the switching component. In some examples, aspects of the operations may be performed using a special-purpose hardware or a control unit such as a microcontroller.

At 715, the method 700 may include transmitting a third signal based at least in part on a comparison of the first signal and the second signal. The third signal may indicate whether a fault has occurred at the switching component. In some examples, aspects of the operations may be performed using a special-purpose hardware or a control unit such as a microcontroller.

Figure 8:
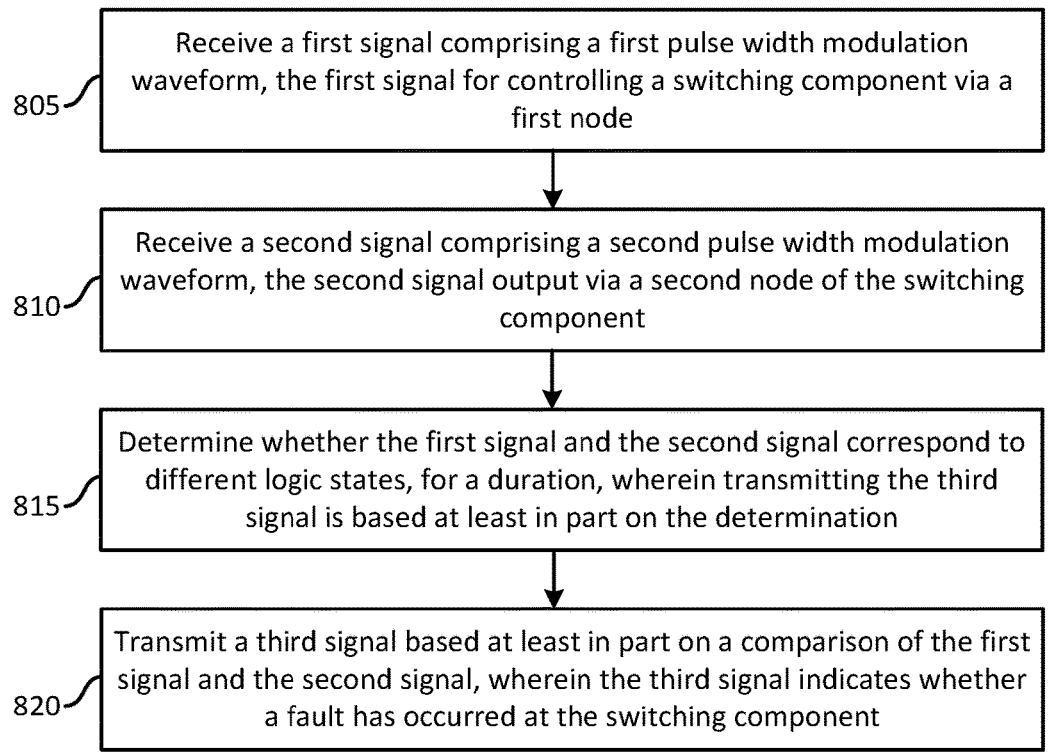

FIG. 8 illustrates an example of a flowchart illustrating a method 800 that supports fault detection methods for pulse width modulation converters. The operations of the method 800 may be implemented by one or more devices as described herein. For example, the method 800 may be implemented by any component of a system described herein, such as a control unit, a controller, a voltage reading network, an ADC, an algorithm module, a relay command module, or one or more logic components. In some cases, a device or component as described herein may execute instructions to control one or more functional elements to perform the described operations. For example, a control unit (e.g., a microcontroller) may execute instructions to perform the method 800. Additionally, or alternatively, a device or component of a system may perform aspects of the described operations using special-purpose hardware.

At 805, the method 800 may include receiving a first signal comprising a first PWM waveform. The first signal may be for controlling a switching component via a first node. In some examples, aspects of the operations may be performed using a special-purpose hardware or a control unit such as a microcontroller.

At 810, the method 800 may include receiving a second signal comprising a second PWM waveform. The second signal may be output via a second node of the switching component. In some examples, aspects of the operations may be performed using a special-purpose hardware or a control unit such as a microcontroller.

At 815, the method 800 may include determining whether the first signal and the second signal correspond to different logic states, for a duration, wherein transmitting the third signal is based at least in part on the determination. In some examples, aspects of the operations may be performed using a special-purpose hardware or a control unit such as a microcontroller.

At 820, the method 800 may include transmitting a third signal based at least in part on a comparison of the first signal and the second signal. The third signal may indicate whether a fault has occurred at the switching component. In some examples, aspects of the operations may be performed using a special-purpose hardware or a control unit such as a microcontroller.

Figure 9:
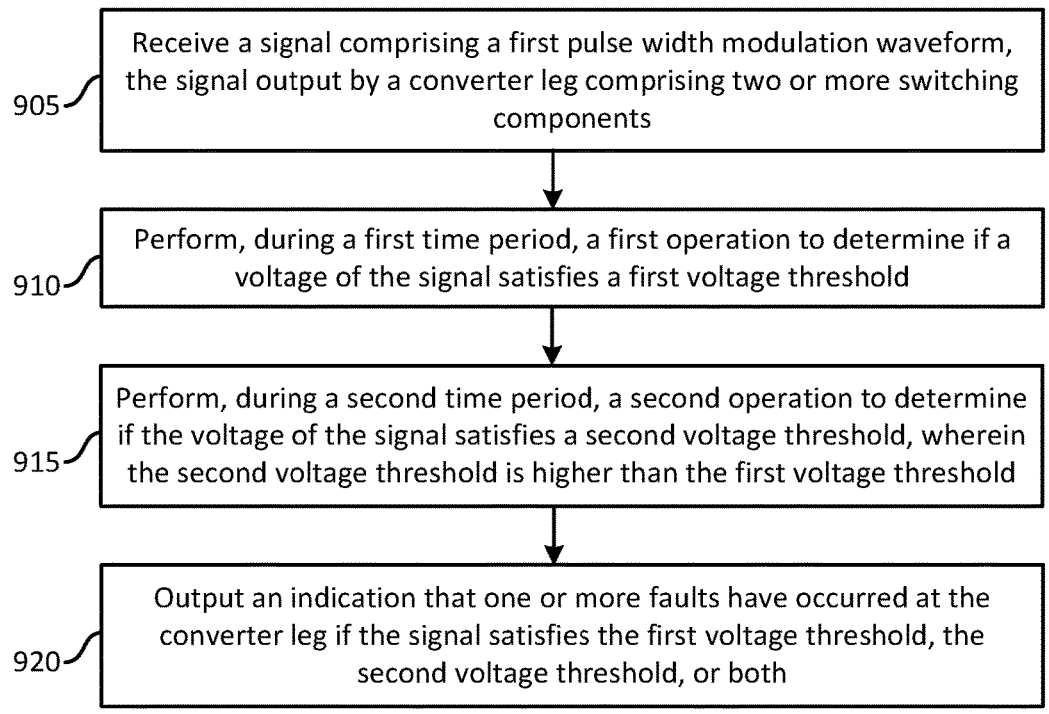

FIG. 9 illustrates an example of a flowchart illustrating a method 900 that supports fault detection methods for pulse width modulation converters. The operations of the method 900 may be implemented by one or more devices as described herein. For example, the method 900 may be implemented by any component of a system described herein, such as a control unit, a controller, a voltage reading network, an ADC, an algorithm module, a relay command module, or one or more logic components. In some cases, a device or component as described herein may execute instructions to control one or more functional elements to perform the described operations. For example, a control unit (e.g., a microcontroller) may execute instructions to perform the method 900. Additionally, or alternatively, a device or component of a system may perform aspects of the described operations using special-purpose hardware.

At 905, the method 900 may include receiving a signal comprising a first pulse width modulation waveform. The signal may be output by a converter leg comprising two or more switching components. In some examples, aspects of the operations may be performed using a special-purpose hardware or a control unit such as a microcontroller.

At 910, the method 900 may include performing, during a first time period, a first operation to determine if a voltage of the signal satisfies a first voltage threshold. In some examples, aspects of the operations may be performed using a special-purpose hardware or a control unit such as a microcontroller.

At 915, the method 900 may include performing, during a second time period, a second operation to determine if the voltage of the signal satisfies a second voltage threshold. The second voltage threshold may be higher than the first voltage threshold. In some examples, aspects of the operations may be performed using a special-purpose hardware or a control unit such as a microcontroller.

At 920, the method 900 may include outputting an indication that one or more faults have occurred at the converter leg if the signal satisfies the first voltage threshold, the second voltage threshold, or both. In some examples, aspects of the operations may be performed using a special-purpose hardware or a control unit such as a microcontroller.

Figure 10:
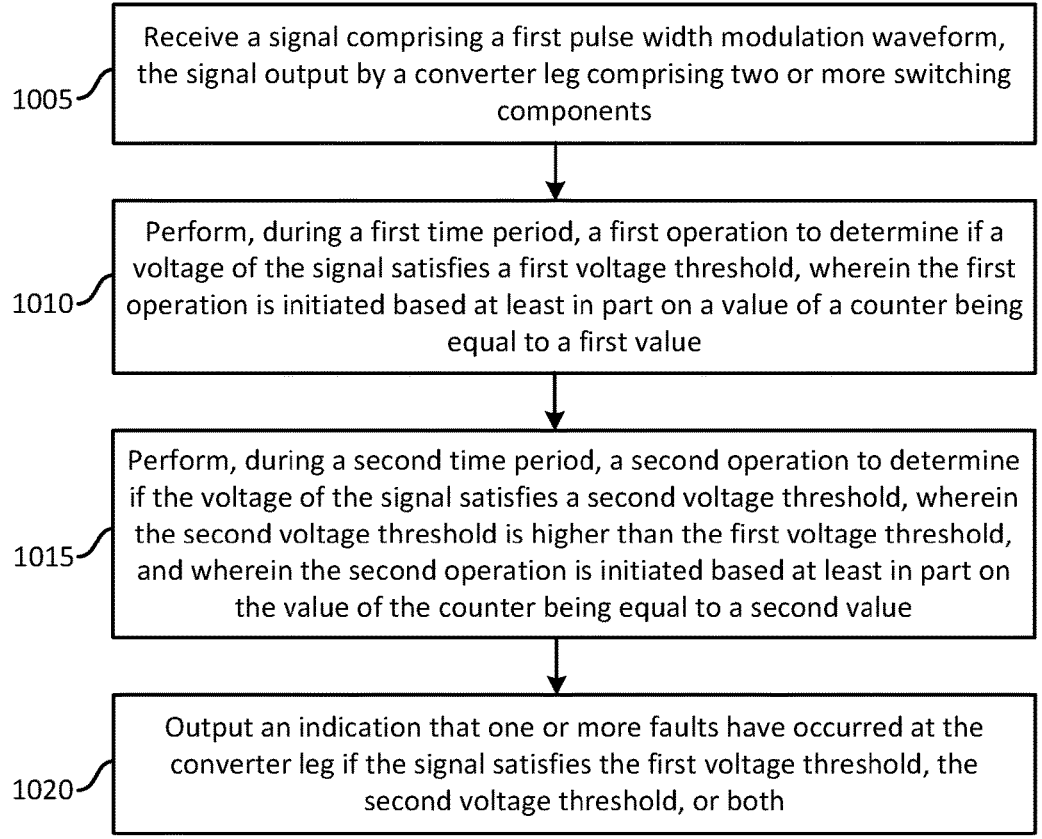

FIG. 10 illustrates an example of a flowchart illustrating a method 1000 that supports fault detection methods for pulse width modulation converters. The operations of the method 1000 may be implemented by one or more devices as described herein. For example, the method 1000 may be implemented by any component of a system described herein, such as a control unit, a controller, a voltage reading network, an ADC, an algorithm module, a relay command module, or one or more logic components. In some cases, a device or component as described herein may execute instructions to control one or more functional elements to perform the described operations. For example, a control unit (e.g., a microcontroller) may execute instructions to perform the method 1000. Additionally, or alternatively, a device or component of a system may perform aspects of the described operations using special-purpose hardware.

At 1005, the method 1000 may include receiving a signal comprising a first pulse width modulation waveform. The signal may be output by a converter leg comprising two or more switching components. In some examples, aspects of the operations may be performed using a special-purpose hardware or a control unit such as a microcontroller.

At 1010, the method 1000 may include performing, during a first time period, a first operation to determine if a voltage of the signal satisfies a first voltage threshold. The first operation may be initiated based at least in part on a value of a counter being equal to a first value. In some examples, aspects of the operations may be performed using a special-purpose hardware or a control unit such as a microcontroller.

At 1015, the method 1000 may include performing, during a second time period, a second operation to determine if the voltage of the signal satisfies a second voltage threshold. The second voltage threshold may be higher than the first voltage threshold. In some cases, the second operation may be initiated based at least in part on the value of the counter being equal to a second value. In some examples, aspects of the operations may be performed using a special-purpose hardware or a control unit such as a microcontroller.

At 1020, the method 1000 may include outputting an indication that one or more faults have occurred at the converter leg if the signal satisfies the first voltage threshold, the second voltage threshold, or both. In some examples, aspects of the operations may be performed using a special-purpose hardware or a control unit such as a microcontroller.

While this detailed description has set forth some embodiments of the present disclosure, the appended claims also cover other embodiments of the present disclosure which may differ from the described embodiments according to various modifications and improvements. Within the appended claims, unless the specific term "means for" or "step for" is used within a given claim, it is not intended that the claim be interpreted under 35 U.S.C. 112, paragraph 6.

The invention claimed is:

1. A system comprising:
a switching component comprising a first node, a second node, and a third node, the switching component configured to selectively couple the first node and the second node based at least in part on a first signal applied to the third node;
a voltage measurement component comprising a fourth node and a fifth node, the fourth node coupled with the second node, wherein the voltage measurement component is configured to output, via the fifth node, a second signal having a first voltage associated with the second node;
a control component comprising a sixth node and a seventh node, the sixth node coupled with the fifth node, wherein the control component is configured to output, via the seventh node, a third signal based at least in part on a first comparison of the second signal and the first signal and/or a second comparison of the second signal and the first signal, the third signal for decoupling the switching component from a load; and
a pulse width modulation voltage source coupled with the switching component, the pulse width modulation voltage source configured to output the first signal, wherein the first signal comprises a pulse width modulation waveform;
wherein the first comparison of the second signal and the first signal is initiated based at least in part on a value of a counter being equal to a first value, and wherein the second comparison of the second signal and the first signal is initiated based at least in part on the value of the counter being equal to a second value.

2. The system of claim 1, further comprising:
a second switching component comprising an eighth node, a ninth node, and a tenth node, the second switching component configured to selectively couple the eighth node and the ninth node based at least in part on a fourth signal, wherein the ninth node is coupled with the second node.

3. The system of claim 1, wherein the control component comprises:
an analog to digital converter, the analog to digital converter configured to receive the second signal having the first voltage from the voltage measurement component.

4. The system of claim 1, wherein the control component comprises:
a fault detection component, the fault detection component configured to execute an algorithm that compares the second signal and the first signal.

5. The system of claim 1, wherein the control component comprises:
a command component, the command component configured to output the third signal based at least in part on the comparison of the second signal and the first signal.

6. The system of claim 1, wherein the control component comprises a microcontroller, the microcontroller configured to output the third signal based at least in part on the comparison of the first signal and the second signal.

7. The system of claim 1, wherein the control component comprises one or more logic gates, and wherein the one or more logic gates are configured to compare the first signal with the second signal and output the third signal based at least in part on the comparison.

8. The system of claim 1, further comprising:
a relay configured to selectively couple the switching component with the load based at least in part on the third signal.

9. The system of claim 1, wherein the first value corresponds to a maximum value of the counter and the second value corresponds to a minimum value of the counter.

10. A method, comprising:
receiving a first signal comprising a first pulse width modulation waveform, the first signal for controlling a switching component via a first node;
receiving a second signal comprising a second pulse width modulation waveform, the second signal output via a second node of the switching component; and
transmitting a third signal based at least in part on a first comparison of the first signal and the second signal and/or a second comparison of the first signal and the second signal, wherein the third signal indicates whether a fault has occurred at the switching component;
wherein the first comparison of the first signal and the second signal is initiated based at least in part on a value of a counter being equal to a first value, and wherein the second comparison of the first signal and the second signal is initiated based at least in part on the value of the counter being equal to a second value.

11. The method of claim 10, further comprising:
determining whether the first signal and the second signal correspond to different logic states, for a duration, wherein transmitting the third signal is based at least in part on the determination.

12. The method of claim 10, further comprising:
determining whether an open circuit or a short circuit has occurred at the switching component based at least in part on whether the first signal and the second signal correspond to different logic states.

13. The method of claim 10, wherein the third signal indicates whether the fault has occurred at any one of two or more switching components, the two or more switching components comprising at least the switching component.

14. The method of claim 10, wherein the first node comprises a gate node of the switching component and the second node comprises a drain node of the switching component.

15. The method of claim 10, further comprising:
receiving a fourth signal comprising a third pulse width modulation waveform, the fourth signal for controlling a second switching component via a third node;
receiving a fifth signal comprising a fourth pulse width modulation waveform, the fifth signal output via a fourth node, the second switching component comprising the third node and the fourth node; and
transmitting a sixth signal based at least in part on a comparison of the fourth signal and the fifth signal, wherein the sixth signal indicates whether a second fault has occurred at the second switching component.

16. The method of claim 10, wherein the first value corresponds to a maximum value of the counter and the second value corresponds to a minimum value of the counter.

17. A method, comprising:
receiving a signal comprising a first pulse width modulation waveform, the signal output by a converter leg comprising two or more switching components;
performing, during a first time period, a first operation to determine if a voltage of the signal satisfies a first voltage threshold;
performing, during a second time period, a second operation to determine if the voltage of the signal satisfies a second voltage threshold, wherein the second voltage threshold is higher than the first voltage threshold; and
outputting an indication that one or more faults have occurred at the converter leg if the signal satisfies the first voltage threshold, the second voltage threshold, or both;
wherein the first operation is initiated based at least in part on a value of a counter being equal to a first value, and wherein the second operation is initiated based at least in part on the value of the counter being equal to a second value.

18. The method of claim 17, wherein the first value corresponds to a maximum value of the counter and the second value corresponds to a minimum value of the counter.

19. The method of claim 17, wherein performing the first operation determines if a fault has occurred at either of the two or more switching components.

20. The method of claim 17, wherein the first operation and the second operation are performed within a single pulse width modulation cycle.

* * * * *